United States Patent
Corbett et al.

(10) Patent No.: US 7,432,675 B1
(45) Date of Patent: *Oct. 7, 2008

(54) METHOD OF REMOVING FOREIGN PARTICLES FROM HEAT TRANSFER SURFACES OF HEAT SINKS

(75) Inventors: Jesse V. Corbett, Clayton, NC (US); David J. Steiner, Raleigh, NC (US); Donald C. Johnson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/020,830

(22) Filed: Jan. 28, 2008

Related U.S. Application Data

(63) Continuation of application No. 11/928,187, filed on Oct. 30, 2007, now Pat. No. 7,348,743.

(51) Int. Cl.
*H02P 1/00* (2006.01)
*H02P 3/00* (2006.01)
*H02P 3/20* (2006.01)
*H02P 5/00* (2006.01)
*H02P 7/00* (2006.01)

(52) U.S. Cl. .................. 318/260; 318/280; 318/811

(58) Field of Classification Search ............... 318/260, 318/280, 811
See application file for complete search history.

(56) References Cited

U.S. PATENT DOCUMENTS

| | | | |
|---|---|---|---|
| 6,152,699 | A | 11/2000 | Shikata et al. |
| 6,987,370 | B2 | 1/2006 | Chheda |
| 7,161,315 | B2 | 1/2007 | Hsu |
| 2007/0131409 | A1 | 6/2007 | Asahi |

*Primary Examiner*—Lincoln Donovan
*Assistant Examiner*—Erick Glass
(74) *Attorney, Agent, or Firm*—Cantor Colburn LLP; Jason O. Piche

(57) ABSTRACT

A method of operating an apparatus for use with a computer, including a power source, a system board, and a heat sink. The method includes operating a fan reversing control card, which is coupled to the system board, to generate normal and reverse cycle rotation signals in predetermined intervals, and controlling a fan, which is coupled to the fan reversing control card, by receiving the normal and reverse cycle rotation signals, and operating in normal and reverse cycles in which the fan rotates in first and second directions, respectively. The method further includes installing the fan within the computer sufficiently proximate to the heat transfer surfaces such that the first and second directional rotations of the fan generate air flows in first and second directions with respect to the heat transfer surfaces, respectively.

3 Claims, 2 Drawing Sheets

METHOD OF REMOVING FOREIGN PARTICLES FROM HEAT TRANSFER SURFACES OF HEAT SINKS

CROSS REFERENCE TO RELATED APPLICATIONS

Figure 1:
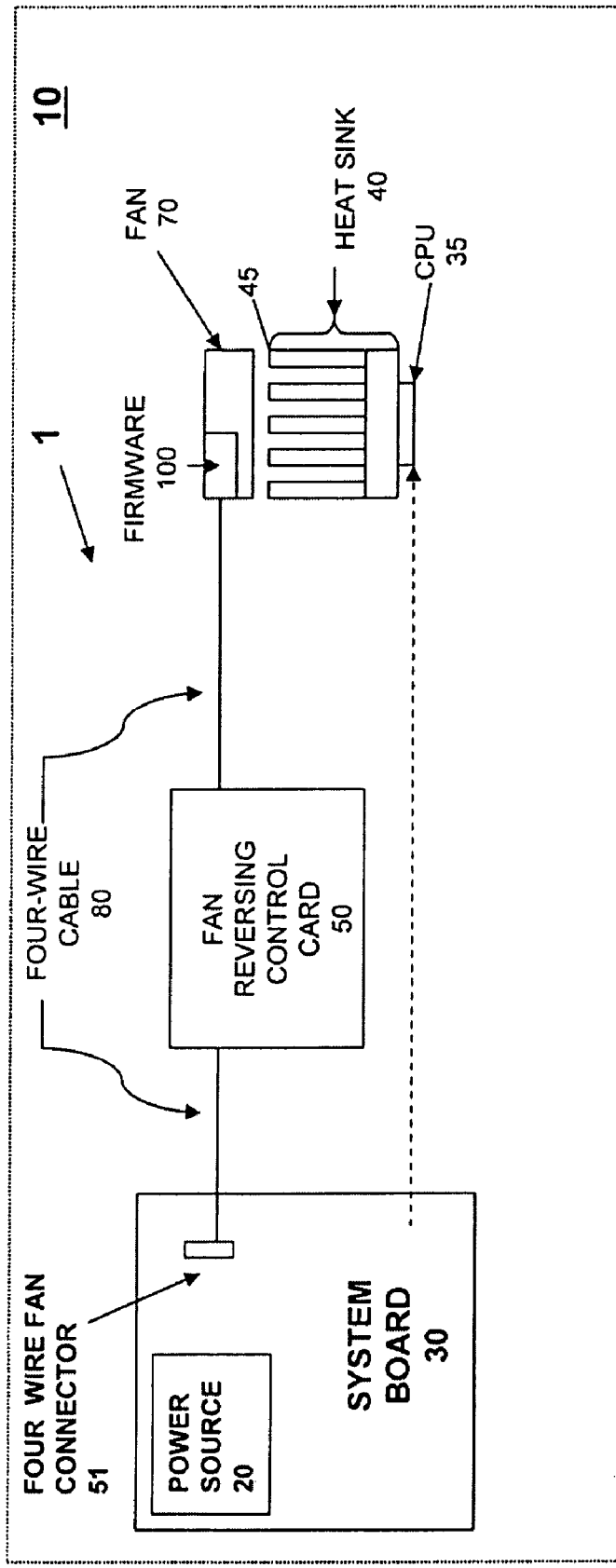

This application is a continuation of U.S. patent application Ser. No. 11/928,187, filed Oct. 30, 2007 now U.S. Pat. No. 7,348,743, the contents of which are incorporated herein by reference thereto.

BACKGROUND OF THE INVENTION

1. Field of the Invention

Aspects of the present invention relate to an apparatus that removes foreign particles from heat transfer surfaces of heat sinks and, more particularly, to heat sinks including fans that operate in forward and reverse directions.

2. Description of the Background

In many computing environments, a computer may be required to operate for often long periods of time without failure or reductions in computing power or efficiency. As a result, an electrical component, such as a central processing unit (CPU) within the computer tends to generate heat that may damage or otherwise negatively affect the computing power and efficiency of the computer. This problem has been dealt with by the employment of heat sinks and fans to remove heat from the electrical component.

Such heat sinks include pluralities of heat transfer surfaces having relatively large exposed surface areas. The heat transfer surfaces are coupled to circuit boards on which the electrical components are supported. Heat, which is generated by the electrical components, is therefore transferred to the heat transfer surfaces from which it is dispersed via the exposed surfaces areas thereof.

Fans have also been employed in conjunction with the heat sinks to increase a degree of the heat transfer by forcing ambient air to flow across the exposed surface areas of the heat transfer surfaces. The ambient air, however, may carry foreign particles, such as dust, that tend to accumulate on the heat transfer surfaces thereby reducing the degree of the heat transfer.

SUMMARY OF THE INVENTION

In accordance with an embodiment of the invention, a method of operating an apparatus for use with a computer, the computer including a power source, a system board, coupled to the power source and disposed within the computer, on which an electrical component, which controls operations of the computer, is installed, and a heat sink including a plurality of heat transfer surfaces which are configured to contact the electrical component and to thereby remove heat from the electrical component, the method comprising operating a fan reversing control card, which is coupled to the system board, to generate normal and reverse cycle rotation signals in predetermined intervals, installing a single fan within the computer and coupling the fan to the fan reversing control card via a four-wire cable, the four-wire cable being configured to operate according to a method comprising carrying a voltage, carrying a ground voltage, transmitting a tachometer output signal by which the fan signals an actual speed of rotations of the fan during the normal and reverse cycles of the fan, and transmitting, between the fan and the fan reversing control card, a pulse width modulation (PWM) signal by which the fan reversing control card, which compares the actual speed of rotation with a desired speed, transmits normal and reverse cycle rotation signals to the fan as speed-up, slow-down, normal and/or reverse cycle initiating instructions, and controlling the fan, which is coupled to the fan reversing control card, by receiving the normal and reverse cycle rotation signals from the fan reversing control card, and respectively operating the fan, in accordance with the receiving of the normal and reverse cycle rotation signals, in normal and reverse cycles, in which the fan rotates in first and second directions, respectively, wherein the method further comprises positioning the installation of the single fan within the computer sufficiently proximate to the heat transfer surfaces such that the first and second directional rotations of the fan generate air flows in first and second directions with respect to the heat transfer surfaces, respectively.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

Figure 2:
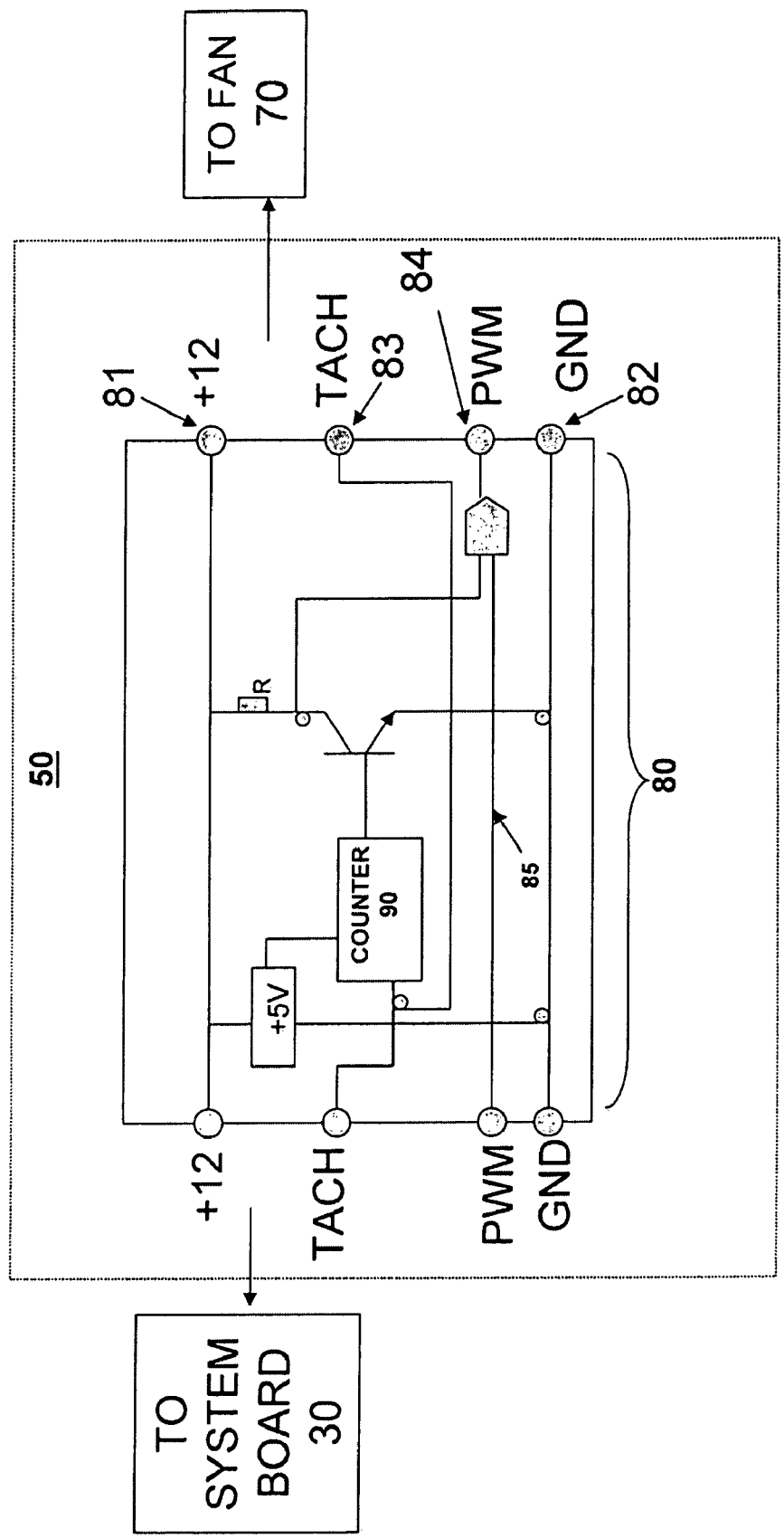

The subject matter which is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a schematic diagram of a connection between a fan and a system board in accordance with an exemplary embodiment of the invention; and FIG. 2 is a schematic diagram of a fan reversing control card in accordance with an exemplary embodiment of the invention.

DETAILED DESCRIPTION OF THE INVENTION

With reference to FIG. 1, in accordance with an embodiment of the invention, an apparatus 1 for use with a computer 10, comprises a power source 20 which provides power to the computer 10 and a system board 30 operably coupled to the power source 20 and disposed within the computer 10. An electrical component 35, which may be a central processing unit (CPU) of the computer 10 and which controls operations of the computer 10, is installed on the system board 30 (this is shown schematically in FIG. 1 by the dotted line extending from the system board 30 to the electrical component 35). A heat sink 40 is coupled to a surface of the system board 30 and includes a plurality of heat transfer surfaces 45, which are configured to remove heat from the electrical component 35.

A fan reversing control card 50 is operably coupled to the power source and configured to generate normal and reverse cycle rotation signals that are received by a fan 70. The fan 70 is operably coupled to the fan reversing control card 50 to receive and to interpret the rotation signals and to operate in normal and reverse cycles accordingly. The fan 70 is disposed within the computer 10 at a location that is sufficiently proximate to the heat transfer surfaces 45 such that the normal and reverse cycles of the fan, in which the fan rotates in first and second directions, generate first and second opposing air flows with respect to the heat transfer surfaces 45, respectively, in response to the received and interpreted rotation signals.

According to exemplary embodiments of the invention, the computer 10 may be specifically designed for retail applications, in e.g., retail shopping establishments, or any other similar applications that require the computer 10 to run continuously for relatively long periods of time. During those lengths of time, the electrical component 35 tends to generate heat that decreases the power and/or efficiency of the electrical component 35 and the computer 10.

The heat sink 40 is employed to cool the electrical component 35 to thereby prevent the occurrence of the decreased efficiency of the computer 10. To that end, the heat sink 40 is attached to the system board 30 such that the heat transfer surfaces 45 directly contact the electrical component 35. In this way, heat generated by the electrical component 35 is transmitted to the heat transfer surfaces 45 and dispersed via their respective exposed areas. That is, as shown in the embodiment of FIG. 1, the heat sink 40 directly attaches to the system board 30 of the computer 10 and supports the heat transfer surfaces 45 to be in at least thermal contact with the electrical component 35.

The fan 70 is employed to increase a degree by which the heat transfer surfaces 45 remove the generated heat from the electrical component 35. Here, as shown in the embodiment of FIG. 1, the fan 70 may be directly attached to the heat sink 40 or may be otherwise supported within the computer 10. In accordance with known structures, the fan 70 includes blades arranged around a hub that, as fan 70 rotates in the first or the second directions, generate the first or the second air flows, respectively. That is, during the normal cycle of the operation of the fan 70, the first air flow, in which air, which is at least partly drawn from ambient air surrounding the computer 10, is blown by the blades toward and over the heat transfer surfaces 45. The blown air thereby increases the degree of the heat transfer accomplished by the heat transfer surfaces 45.

However, it is noted that the ambient air may contain foreign particles, such as dust, which tend to accumulate on and thereby hinder the operation of the heat transfer surfaces 45. As such, during the reverse cycle of the fan 70, the second air flow is employed as a countermeasure. That is, the second air flow, in which air is blown by the blades in an opposite direction from the air flow direction described above with respect to the heat transfer surfaces 45, removes some or all of any foreign particles that have accumulated on the heat transfer surfaces 45.

According to an embodiment of the invention, the fan reversing control card 50 may be either built directly into the system board 30 of the computer 10 or may be attached to the system board 30 of the computer via a four-wire fan connector 51.

With reference to FIGS. 1 and 2, the fan 70 is operably coupled to the fan reversing control card 50 by a four-wire cable 80. The four-wire cable 80 comprises a voltage carrying wire (+12) 81, a grounded wire (GND) 82, a tachometer output wire (TACH) 83 and a pulse width modulation (PWM) wire 84. The tachometer output wire 83 allows the fan 70 to inform the fan reversing control card 50 of an actual speed of the rotation of the fan 70 in, e.g., the first direction. The pulse width modulation (PWM) wire 84 allows the fan reversing control card 50, which compares the actual speed of rotation of the fan 70 with a desired speed of rotation, to transmit speed-up, slow-down or initiate reverse cycle instructions to the fan 70 via a PWM signal 85.

In accordance with embodiments of the invention, a counter 90 is disposed within the fan reversing control card 50 and is configured to allow the fan reversing control card 50 to determine when to instruct the fan 70 to switch between the normal and reverse cycles, and, when the fan 70 is to switch from the normal to the reverse cycle, to issue the PWM signal 85 with zero volts. In exemplary embodiments of the invention, the normal cycles of the fan operate continuously for, e.g., several days in a row, while the corresponding reverse cycles last for about 8 seconds at a time. Here, using the counter 90, the fan reversing control card 50 may accomplish the determinations by counting tach pulses from the fan 70 on the tachometer output wire 83 and grounding the PWM signal wire 84 for about three seconds so as to issue the PWM signal 85 with zero volts according to known methods. This results in the reverse cycle lasting for the period of about 8 seconds. Subsequently, the PWM signal 85 is issued normally and the fan 70 resumes the normal cycle.

As a further embodiment of the invention, where the fan reversing control card 50 is built into the system board 30, it is also possible to design the system board 30 and the fan reversing control card 50 to determine when to activate the reversing cycle based on environmental parameters such as ambient temperatures, power on/off cycles, HDD (Hard disk drive) temperature and long term CPU temperature, or combinations thereof.

Firmware 100 is disposed within the fan 70 and is configured to receive and to interpret the PWM signal 85. The firmware 100 initiates the reverse cycle of the fan 70 when the PWM signal 85 is found to have zero volts.

In accordance with further embodiments of the invention, the fan 70 may comprise a brushless direct current (BLDC) motor or other types of motors, such as brushed DC motors, three phase AC synchronous motors, steppers motors or reluctance motors, which may be used with similar effect. Moreover, the initiation of the normal or reverse cycles of the 70 may be based on a detection of a duty cycle of the PWM signal 85. For example, a non-inclusive range of 0%-90% of a duty cycle may drive the rotation of the fan 70 in the first direction while an inclusive range of 90%-100% of the duty cycle may drives the rotation of the fan 70 in the second direction. In addition, the fan 70 may be coupled to ductwork within the computer 10 that extends from the fan 70 to an exterior facing vent. Here, the first and second air flows communicate with the ambient air surrounding the computer 10.

In accordance with still further embodiments of the invention, it is understood that the invention may be realized as a method of cleaning the heat sink 40. Such a method comprises operating the normal cycle of the fan 70 for a first period of time, operating the reverse cycle of the fan 70 for a second period of time based on the first period of time and resuming the normal operation of the fan 70 following the operation of the reverse cycle.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A method of operating an apparatus for use with a computer, the computer including a power source, a system board, coupled to the power source and disposed within the computer, on which an electrical component, which controls operations of the computer, is installed, and a heat sink including a plurality of heat transfer surfaces which are configured to contact the electrical component and to thereby remove heat from the electrical component, the method comprising:

operating a fan reversing control card, which is coupled to the system board, to generate normal and reverse cycle rotation signals in predetermined intervals;

installing a single fan within the computer and coupling the fan to the fan reversing control card via a four-wire cable, the four-wire cable being configured to operate according to a method comprising:

carrying a voltage between the fan and the fan reversing control card, carrying a ground voltage between the fan and the fan reversing control card, transmitting, between the fan and the fan reversing control card, a tachometer output signal by which the fan signals an actual speed of rotations of the fan during the normal and reverse cycles of the fan, and transmitting, between the fan and the fan reversing control card, a pulse width modulation (PWM) signal by which the fan reversing control card, which compares the actual speed of rotation with a desired speed, transmits normal and reverse cycle rotation signals to the fan as speed-up, slow-down, normal and/or reverse cycle initiating instructions; and controlling the fan, which is coupled to the fan reversing control card, by receiving the normal and reverse cycle rotation signals from the fan reversing control card, and respectively operating the fan, in accordance with the receiving of the normal and reverse cycle rotation signals, in normal and reverse cycles, in which the fan rotates in first and second directions, respectively, wherein:

the method further comprises positioning the installation of the single fan within the computer sufficiently proximate to the heat transfer surfaces such that the first and second directional rotations of the fan generate air flows in first and second directions with respect to the heat transfer surfaces, respectively.

2. The method according to claim 1, further comprising:

building the fan reversing control card directly into the system board, or attaching the fan reversing control card to the system board via a four-wire fan connector.

3. The method according to claim 1, further comprising:

installing a counter within the fan reversing control card;

configuring the counter to allow the fan reversing control card to determine when to instruct the fan to switch between the normal and reverse cycles, and, when the fan is to switch from the normal to the reverse cycle, to issue the PWM signal with zero volts;

installing firmware within the fan; and configuring the firmware to receive and to interpret the PWM signal, which initiates the reverse cycle when the PWM signal has zero volts.

\* \* \* \* \*